United States Patent
Persson

(10) Patent No.: US 11,066,301 B2
(45) Date of Patent: Jul. 20, 2021

(54) SYSTEM FOR EXTRACTING GASEOUS MOLECULES FROM AIR

(71) Applicant: Claes Persson, Stockholm (SE)

(72) Inventor: Claes Persson, Stockholm (SE)

(*) Notice: Subject to any disclaimer, the term of this patent is extended or adjusted under 35 U.S.C. 154(b) by 143 days.

(21) Appl. No.: 16/095,353

(22) PCT Filed: May 27, 2016

(86) PCT No.: PCT/SE2016/050491
§ 371 (c)(1),
(2) Date: Oct. 20, 2018

(87) PCT Pub. No.: WO2017/204706
PCT Pub. Date: Nov. 30, 2017

(65) Prior Publication Data
US 2019/0135630 A1    May 9, 2019

(51) Int. Cl.
*C01B 3/50* (2006.01)
*B01D 53/22* (2006.01)
(Continued)

(52) U.S. Cl.
CPC .............. *C01B 3/503* (2013.01); *B01D 53/22* (2013.01); *B01D 53/226* (2013.01);
(Continued)

(58) Field of Classification Search
CPC .... B01D 53/22; B01D 53/226; B01D 53/228; B01D 71/021; B01D 2256/16;
(Continued)

(56) References Cited

U.S. PATENT DOCUMENTS

| 9,278,318 | B2 | 3/2016 | Anderson | |
| 2003/0061938 | A1* | 4/2003 | Kunstadt | B01D 53/22 96/4 |
| 2013/0270188 | A1* | 10/2013 | Karnik | B01D 71/021 210/650 |

FOREIGN PATENT DOCUMENTS

| WO | 2001/030471 A2 | 5/2001 | |
| WO | WO 01/30471 A2 * | 5/2003 | ............ B01D 53/22 |
| WO | 2016/042309 A1 | 3/2016 | |

OTHER PUBLICATIONS

International Search Report and Written Opinion from corresponding International Application No. PCT/SE2016/050491, dated Feb. 24, 2017; 9 pages.

(Continued)

Primary Examiner — Jason M Greene
(74) Attorney, Agent, or Firm — Tucker Ellis LLP

(57) ABSTRACT

The invention relates to a system for separating and storing molecules, atoms and/or ions from air, wherein at least one air collecting means comprises at least one collecting tank configured to receive molecules, atoms and/or ions separated from air through an inlet and at least one membrane adapted to fit in the inlet of the collecting tank and configured to let a specified pre-determined size of molecules, atoms and/or ions to pass through the at least one membrane. The system further comprises at least one storing tank for storing the separated molecules, atoms and/or ions, and at least one outlet. The system according to the invention can be used to utilize the energy present in such molecules or separate unwanted gases present in the air.

15 Claims, 2 Drawing Sheets

(51) Int. Cl.
*B01D 63/06* (2006.01)
*B01D 63/08* (2006.01)
*B01D 71/02* (2006.01)

(52) U.S. Cl.
CPC ........... *B01D 53/228* (2013.01); *B01D 63/06* (2013.01); *B01D 63/08* (2013.01); *B01D 71/028* (2013.01); *C01B 3/501* (2013.01); *B01D 2256/12* (2013.01); *B01D 2256/16* (2013.01); *B01D 2256/22* (2013.01); *B01D 2256/245* (2013.01); *B01D 2256/26* (2013.01); *B01D 2259/4525* (2013.01); *B01D 2319/025* (2013.01)

(58) Field of Classification Search
CPC .......... B01D 2256/22; B01D 2256/245; B01D 2256/26; B01D 2317/02; B01D 2317/025; B01D 2319/025; C01B 3/501; C01B 3/503
See application file for complete search history.

(56) References Cited

OTHER PUBLICATIONS

Written Opinion of the International Preliminary Examining Authority from corresponding International Application No. PCT/SE2016/050491, dated May 25, 2018, 5 pages.
International Preliminary Report on Patentability from corresponding International Application No. PCT/SE2016/050491, dated Aug. 15, 2018, 9 pages.

* cited by examiner

SYSTEM FOR EXTRACTING GASEOUS MOLECULES FROM AIR

The present invention refers to a system for utilizing energy from air and wind, by filtering the air through one or more nano membranes. The invention further refers to filtration of other gases from the atmosphere.

BACKGROUND

It is well known that the energy consumption in the world today increases for every year and that new energy sources are needed in the future.

Traditionally, coal has been the largest energy source in the world, followed by oil, natural gas, hydro power and renewable energy.

Fossil fuels, such as oil, coal and gas are cheap and can be stored, but they are also dirty, both during combustion and during extraction. Oil fields, coal mines, open-cast mines, etc contaminates the nature around us. Fossil fuels are not present everywhere, it is an economic environmental source, as well as a power resource in a few countries. The fossil fuels accounts for approx. 85% of the energy need in the world today and it increases every year.

Hydro power is usually considerably cheap and also possible to store. However, the enormous reservoirs of water are irreparable and dramatic interventions in the nature. The hydro power is a limited natural resource in a few countries. Hydro power accounts for approx. 6-7% of the total energy production in the world today.

Wind and solar energy is expensive and the energy must be used at once, since it cannot be stored. Wind and solar energy is possible to produce in varying extent in all countries. Production of energy out of wind and sun is marginal and only accounts for approx. 1.5% of the energy consumption in the world.

Bio fuels are also quite expensive and are not nearly enough to replace the volumes of oil, gas and coal, since the fertile area on earth is largely already used, especially for food production to the growing population. Biofuels, such as wood, are not present in all countries, making the wood a power resource for only a few countries. Bio fuels, wood and waste account for approx. 2.5% of the energy consumption in the world today.

Nuclear power is possible to store and is relatively cheap to produce. However, nuclear power also brings along the risk of meltdowns and the possibility to produce nuclear weapons. Storage of nuclear waste is also an unsolved problem. Nuclear waste must be stored for a very long time and there are already hundreds of thousands of tons of nuclear waste that are not terminally stored. Nuclear power therefore arises anxiety to a lot of people. Uranium is present in a few countries and nuclear power accounts for approx. 4.5% of the energy production in the world.

Hydrogen gas is a gas that is storable and the only waste during combustion is water. Hydrogen gas is expensive and only contributes to a very small part of the energy production in the world today.

Recently there has been a large increase in international agreements and national Energy Action Plans, such as the EU 2009 Renewable Energy Directive, to increase the use of renewable energy due to the growing concerns about pollution from energy sources that come from fossil fuels such as oil, coal, and natural gas.

As mentioned above, wind power and solar power are two examples of such renewable energy sources, however, wind power and solar power only provides approx. 1.5% of the total energy need in the world as of today while fossil fuels stands for approx. 85%. Another problem with wind power and solar energy is that it cannot be stored. There is hence a need for another energy source that can be stored and that are not harmful to our environment.

There are enormous amounts of air present in the atmosphere and it is a wind blowing almost always at most places in the world. This force, energy from wind and air, is free of charge, and substances present in the air can be used as a renewable energy source if they are collected and separated from the rest of the air.

Hydrogen gas is one of the most promising energy sources in the world. Hydrogen gas has more than three times higher energy per kilo compared to oil and methane gas. Hydrogen gas is clean and it is possible to store it. The air also comprises methane gas. Methane gas contains less energy, but there is 25 times more methane in air as compared to hydrogen gas. Methane gas is fairly easy to clean during combustion and is therefore also useful as an energy source for the future. Heretofore there has been no way to extract and separate the useful molecules from the air and to convert them to a renewable energy source.

Accordingly, there is a need for a method and system to utilize renewable energy sources, such as energy from air and wind present in the atmosphere.

SUMMARY

The system presented in the present application is a possible way to replace other energy sources in the world, and a possible way to solve some of the energy, climate and environmental problem in the world today.

In one aspect, a system for separating and storing molecules, atoms and/or ions from air is described. The system includes at least one air collecting means, which air collecting means comprises at least one collecting tank configured to receive molecules, atoms and/or ions separated from air through an inlet; and at least one membrane, wherein the membrane is adapted to fit in the inlet of the collecting tank and is configured to let a specified pre-determined size of molecules, atoms and/or ions to pass through the membrane. The system further includes at least one storing tank for storing the specified type of molecules, atoms and/or ions, and at least one outlet. The system can further be provided with at least one wind collecting means configured to direct a flow of air towards the inlet of the air collecting means.

The air collecting means is preferably a gas tower, a gas balloon or other appropriate means for collecting air.

The membrane used in the system according to the present invention is preferably a multi-layer sheet membrane or an array of membranes. The membrane is a nano membrane such as a graphene membrane or a borophene membrane or the like. It is possible to use more than one membrane and/or more than one multi-layer sheet membrane and/or more than one array of membranes. When more than one membrane are used, the membranes are placed after each other at an appropriate distance from each other, either horizontally or vertically in the air collecting means. It is possible to combine different kind of nano membranes, such as for example when two membranes are used is either both graphene membranes, both are borophene membranes or one is a borophene membrane and the other is a graphene membrane. Also other types of nano membranes can be used. In a multi-layer sheet membrane or array of membrane, different layers can be composed of different nano membranes.

When more than one membrane are used to separate molecules, atoms and/or ions from air, the first of the at least two membranes is used to filter out gaseous molecules which have a size that is smaller than a first determined size and the second membrane is used to filter out gaseous molecules which have a second pre-determined size, wherein the second pre-determined size is smaller than the first pre-determined size.

In another embodiment of the system, the system comprises an air collecting means (1) consisting of several cooperating air collecting means connected to each other. The system can also comprise two or more separated storage tanks (4) for storing the collected gases, especially if more than one gas are separated and are to be stored and/or used at different locations. The air collecting means can consist of several cooperating air collecting means connected to each other. When several air collecting means are used together it can be preferred to place them in a circular formation to be able to collect wind from all directions.

In a further preferred embodiment of the present invention, a system is described wherein the at least one membrane covers at least half of the outer area of the at least one air collecting means.

In a further preferred embodiment of the present invention, a system is wherein several air collecting means are placed in close vicinity of each other. This can preferably be done at very windy locations to better make use of natural wind to drive the air towards the inlet of the air collecting means. The system according to pre present invention can further be provided with at least one wind collecting means configured to direct a flow of air towards the inlet of the air collecting means.

DETAILED DESCRIPTION

Figure 1:
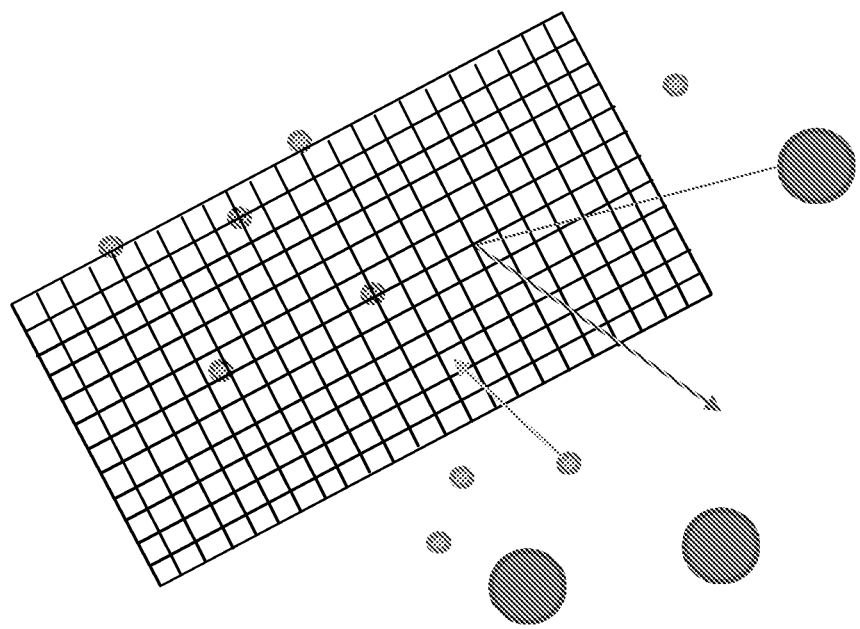
FIG. 1 shows a schematic view of a membrane

The system according to the invention comprises an air collecting means configured to receive a flow of air. The air collecting means must be able to collect large amounts of air and can for example be a gas tower, a gas balloon or another arrangement for optimizing collection of air and wind or any combination of these. The air collecting means can be connected to each other to be used together in a cooperative way. The shape and the size of the air collecting means are adapted for optimum collection of molecules from the air.

In this description the expression "gaseous molecules" are intended to also cover ions and atoms present in the atmosphere. The expressions "air" and "atmosphere" are intended to mean the same.

It is also possible to place several air collecting means 1 in close vicinity of each other, preferably next to each other and to join them together to build a strong framework. The shape and size of the air collecting means 1 may be the same for each air collecting means 1 or may be different depending on the location and direction of the air collecting means 1.

One possible way to build such a system of air collecting means 1 is to build gas towers by using framework system towers, similar to the ones used in modern hoisting cranes. The framework towers can for example be placed in a circle and joined together using framework lattice and wires. The towers will in that way stabilize each other. A person skilled in the art will realize that also other ways to hold the towers together are possible to use. The person skilled in the art will also recognize that the number of air collecting means used in a system is arbitrary and can range from a single air collecting means to up possibly a hundred of air collecting means, or even more.

A gas tower used in the system can preferably be a gas tower having a cylindrical cross-section, even though a person skilled in the art will readily recognize that other types of cross-sections may be employed, e.g. square, rectangular or oval cross-sections.

When the air collecting means 1 are placed next to each other in a circular manner, it will be possible to collect molecules from the air/atmosphere using the wind blowing air towards the air collecting means 1 from all directions. It is also possible to place air collecting means in other advantageous formations to collect air and wind in an efficient way. The formation may be adapted for each location for optimum performance. A person skilled in the art will be able to adapt the formation of the air collecting means 1 in order to collect the highest amount of wind for each location where the system is built.

The air collecting means 1 is provided with at least one inlet 3 of the air collecting means 1. The air collecting means can further be provided with at least one wind collecting means 2 to direct and force a flow of air towards and through the inlet 3 of the air collecting means 1. The wind collecting means 2 preferably has a wider inlet at the distant end from the air collecting means and a narrower outlet adjacent to the air collecting means 1. The wind collecting means 2 can for example have a conical form. The wind collecting means 2 can for example be a sail or canvas, an air blast deflector or any other suitable means for directing and/or forcing the air/wind towards the tower. The shape and size of the wind collecting means 2 are adapted for optimum direction of the air towards the air colleting means land may be the same for each wind collecting means 2 or may be different depending on the location and direction of the wind collecting means 2.

The air collecting means 1 is further provided with at least one inlet 3 for the air. The at least one inlet 3 is preferably provided in a vertical direction on the air collecting means 1 and can extend vertically along the most of the outer surface or a part of the outer surface of the air collecting means 1. The shape and size of the at least one inlet 3 is adapted for optimum intake of air into the at least one air collecting means land may be the same for each inlet 3, in case of more than one inlet 3 or may be different depending on the location and direction of the inlet 3.

The inlet 3 is further provided with at least one membrane 5. The membrane 5 used in the present invention is a membrane that works as a selective barrier, where some molecules, atoms and ions can pass through the membrane 5, while others will bounce back out in the atmosphere. The membrane 5 according to the invention will be one that can exclude molecules, atoms and ions based on their size, as shown in FIG. 1. The membrane 5 can preferably be in the form of a thin sheet or layer that are placed around at least a part of the outer surface of the air collecting means 1.

In this description the word "membrane" is intended to describe a material that is a semi permeable membrane or filter to separate out selected gaseous ions, atoms or molecules from the atmosphere. It can be a nano membrane such as a graphene membrane, a borophene membrane, or any other membrane with the ability to filter out gaseous molecules, ions and atoms. The word filter can also be used as a synonymous with membrane.

The shape and size of the membrane 5 is adapted for optimum extraction of molecules from the air and may be the same for each membrane 5, in the case where more than one membrane 5 is used or may be different depending on what type of molecule(s) that are to be extracted. To achieve this it will most probably be necessary to stack layers of membranes 5 on top of each other to create a multi-layer sheet or array of membranes as a set of membranes.

The set of membranes, i.e. the multi-layer sheet or array of membranes, is preferably a nano membrane or other suitable multi-layer of membrane with capability to only let the selected type of gaseous molecules, atoms or ions pass through the membrane 5. In such a set of membranes, the different sheets or layers can be different types of nano membranes, or they can all be the same type of nano membrane. Gaseous molecules, atoms and ions that have a size that is too large to pass through the multi-layer membrane will bounce back out in the air, while molecules, atoms and ions having a size that is small enough to pass through the multi-layer membrane (see FIG. 1) will enter a collecting tank 4. In this way it is possible to filter out gaseous molecules, atoms or ions that can be used to produce energy, by adapting the multi-layer membrane to only let molecules of a certain pre-determined size to pass through the membrane 5. It is also possible to filter out harmful gaseous molecules, atoms and ions to reduce the amount and number of harmful substances present in the atmosphere.

A membrane or set of membranes 5 to be used in this application must be able to filter out very small atoms, such as hydrogen, helium, methane, carbon dioxide or oxygen. One such membrane is a graphene membrane. Graphene is an exceptionally strong and conductive material composed of a single atomic layer of carbon. To put layers of graphene on each other to create multi-layer graphene sheets has previously been described in U.S. Pat. No. 7,071,258 (Jang et al.). Graphene membranes as such are described for example in WO 2016/042309.

Hydrogen, helium and methane are gaseous at ambient temperatures and are all present in the atmosphere and it is likely that they can be filtered out of the atmosphere by using a membrane, or multi-layer sheet or array of membranes, that only let very small molecules, ions and atoms to pass through.

It has been found that a graphene membrane can be used to extract hydrogen from a humid atmosphere, if necessary by adding a small amount of electricity. The present invention implements this founding in a system for extracting hydrogen, as well as other small molecules, atoms and/or ions from the air, by combining a gas tower with wind collecting means 2 that drives air towards an inlet 3 of the tower, wherein the inlet 3 comprises a membrane 5 that can be used to separate desired gaseous atoms, ions and/or other molecules from the air that is forced through the membrane 5. Besides hydrogen it could also be beneficial to be able to filter out methane gas and helium gas from the atmosphere.

Other possible membranes 5 that can be used includes, but are not limited to, borophene membranes. In a multi-layer sheet membrane or array of membrane, different layers can be composed of different nano membranes, i.e layers of borophene and layers of graphene for example can be put on top pf each other. It is also possible to combine a multi-layer sheet of graphene with a multi-layer sheet of borophene or other nano membrane.

Figure 2:
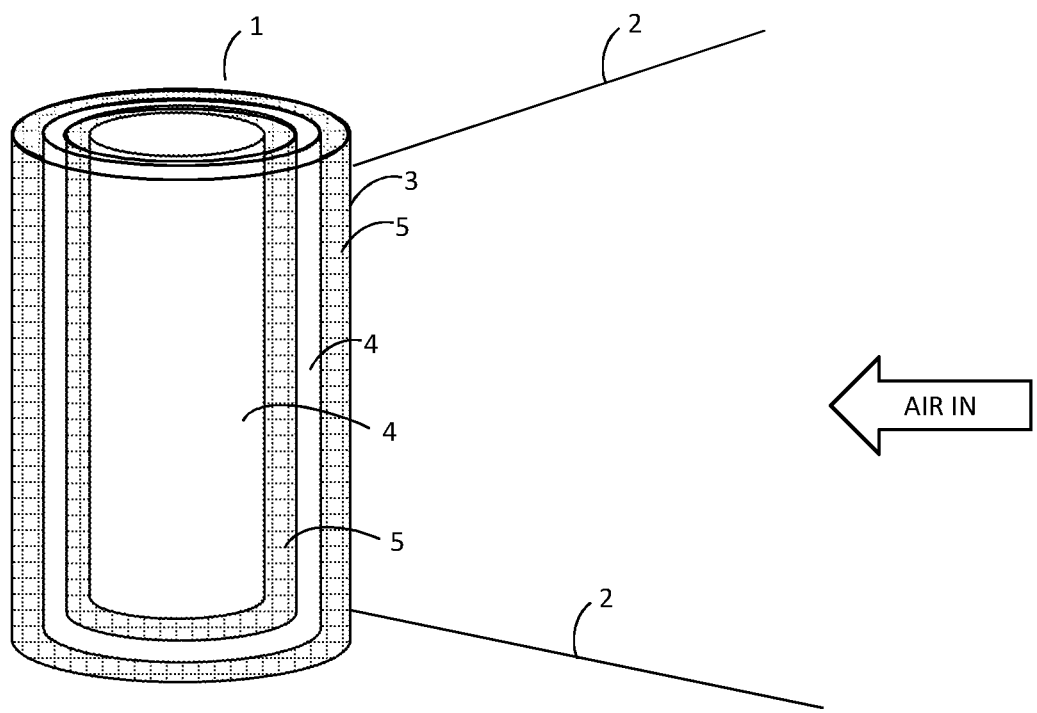
FIG. 2 shows an illustration of a system for separating and storing gaseous molecules according to an advantageous embodiment

In order to filter out more than one type of molecules, ions and/or atoms, it could be necessary to use more than one set of membranes 5. It is thus possible to place at least two membranes 5 after each other, at a suitable distance from each other, each membrane 5 are also provided with a collecting tank 4 (see FIG. 2). In FIG. 2 a system with a gas tower 1 is shown. The gas tower 1 comprises two separate membranes 5 and two separate collecting tanks 4. A person skilled in the art will understand that it will be possible to have more than two membranes and more than two collecting tanks in a system according to the invention. In the case where more than one membrane 5 is used, the membrane closest to the outer surface of the air collecting means 1 must be the membrane that lets the biggest molecules pass through the membrane, for example methane gas, into a collecting tank placed inside the air collecting means 1. Since both hydrogen gas and helium gas are smaller than methane gas, both hydrogen gas and helium gas will also pass through the first membrane or set of membranes 5' together with the methane. It is then possible to place a second membrane or set of membranes 5" that only lets, for example, hydrogen and helium to pass through, which leaves the methane in a first collecting tank 4', and helium and hydrogen in a second collecting tank 4". It is then possible to place a third filter 5''' that only lets helium pass through, leaving the hydrogen gas in the second collecting tank 4" and helium in a third collecting tank 4'''. Since the gases have different molecular weight it might also be possible to separate the gaseous molecules based on their weight.

Figure 3:
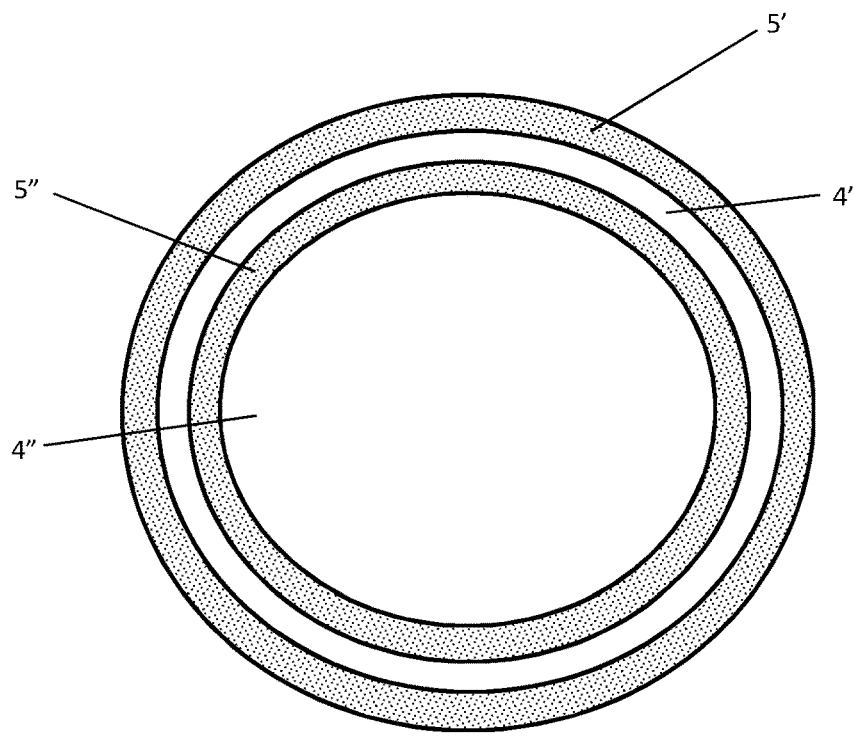
FIG. 3 shows an illustration of a top view of the an air collecting means
Figure 4:
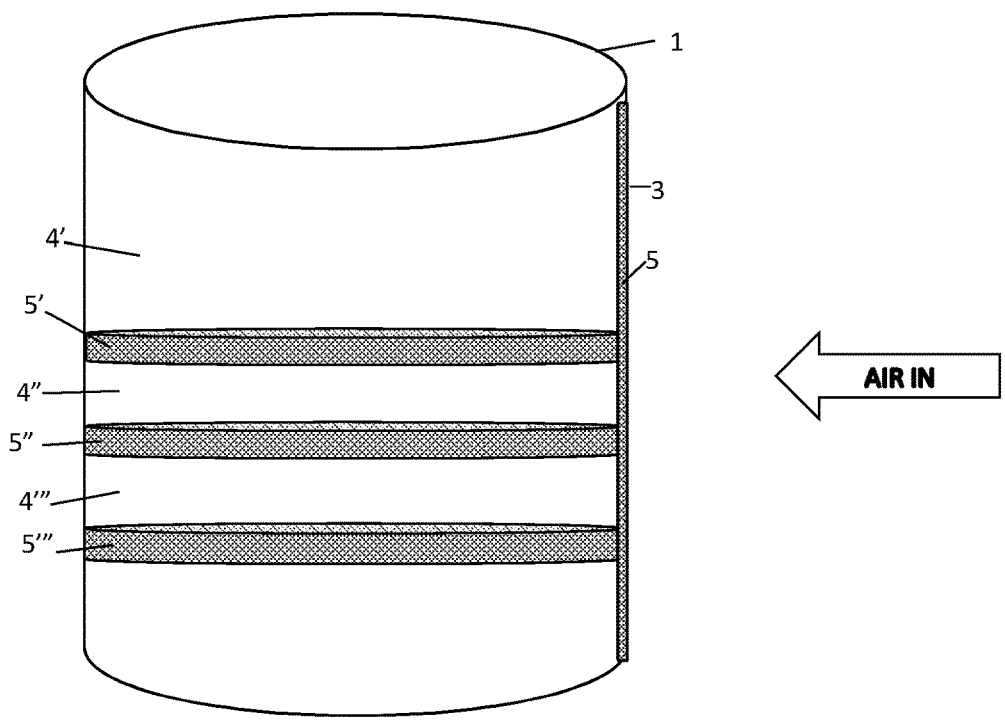
FIG. 4 shows an illustration of a system for separating and storing gaseous molecules according to an advantageous embodiment

FIG. 3 shows a top view of an air collecting means and are only intended to more clearly show one preferred embodiment having two membranes 5', 5" and two separated collecting tanks 4', 4". Gaseous molecules that are small enough to pass through the membrane 5' will enter the first collecting tank 4' and gaseous molecules that are small enough to also pass through the membrane 5" will continue to collecting tank 4". It is also possible to place the membranes and collecting tanks horizontally, as illustrated in FIG. 4. FIG. 4 shows an air collecting means 1, with a first vertical membrane 5 to only let out molecules, atoms and ions of a pre-determined size to pass through. The molecules, atoms and ions that are let through will then be lead to either the bottom or the top of a first collecting tank 4. The air collecting means 1, according to FIG. 4 are then provided with three separated membranes 5', 5" and 5''', each membrane letting molecules, ions and atoms of different size pass through the membrane and each membrane connected to a collecting tank 4', 4", 4'''. The molecules, atoms and ions will then either be led through the membranes to filter them based on size or they will be separated based on molecular weight or any other appropriate technique to separate the gaseous molecules, atoms and ions.

It is also possible to combine for example one or more graphene membranes with one or more other nano membranes, such as for example a borophene membrane.

It is also possible to use a folded membrane in order to increase the surface of the membrane 5. The membrane 5 is preferably a thin mesh or sheet that can be placed at the outer surface of the gas collecting means. The membrane 5 used in the present invention are preferably only a few mm thick. It can cover almost the total outer circumference of the gas collecting means, or if more suitable only a part of the outer circumference of the gas collecting means. This can be adapted for each system.

The system further comprises at least one collecting tank 4 configured to receive a flow of the extracted molecules that have passed through the membrane 5. The at least one collecting tank 4 is placed inside the air collecting means land is provided with at least one exhaust outlet to move the collected gas to for example a storing tank 6.

The system further comprises at least one storing tank 6 for storing the extracted molecules in a safe way. Both the storing tanks 6 and the collecting tanks 4 must be adapted to the type of molecules collected, both with respect to the capability of the molecules to diffuse into other materials and with respect to safety. If more than one type of molecules are extracted, a storage tank 6 for each type of molecule can be used, or one storage tank 6 for all the gases can be used.

Tanks for storing the gas can be placed either inside the tower(s) or outside in the vicinity or the gas can be lead in pipelines or gas conduits to another place for storing and/or converting the gas.

The system according to the present invention can further comprise a separate outer inlet filter to filter off dust, leaves, chemicals etc. that are present in the air. Such filters are well known in the field and can easily be adapted by a person skilled in the art. Such a filter will be placed on the outer surface of the air collecting means 1.

The system according to the invention can be combined with for example a wind or solar power plant to further increase the energy efficiency.

The air collecting means 1 can for example be provided with a wind turbine assembly positioned on the top of the air collecting means so that a shaft rotates at a rate proportional to the magnitude of the wind blowing, such as a vertical-axis wind turbine (VAWT). Such turbines have the main rotor shaft arranged vertically, which means that the turbine does not need to be pointed into the wind to be effective. This is an advantage on a site where the wind direction is highly variable.

Another possibility is to use a horizontal-axis wind turbine (HAWT) coupled to the air collecting means. A HAWT have the main rotor shaft and electrical generator at the top of a tower, and must be pointed into the wind. A horizontal-axis wind turbine could be placed on top of the air collecting means or in close vicinity to the air collecting means or possibly connected to the tower of the air collecting means at a vertically projecting arm.

The air collecting means 1 can further be provided with a solar cell plant comprising solar panels on top of the air collecting means and/or along a part of the vertical outer surface of the air collecting means, not covering the membrane 5.

The system according to the present invention can be used to utilize energy stored in the gaseous molecules, atoms and/or ions present in the air. Extracted hydrogen gas can for example be stored and/or transferred to a fuel cell plant to be burned.

The system according to the invention can take care of energy present in the air and wind in a new and inventive way, by taking care of hydrogen gas and methane gas present in the air, the secondary energy in the wind, by filtering the air through one or more nano and/or graphene and/or borophene membranes.

The system according to the present invention will in this way take care of energy present in the air surrounding us in more than one way; the wind power; the solar power; and the content in the wind/air can be converted into energy. This will multiply the energy efficiency as compared to a conventional wind power plant or solar power plant.

The system according to the present invention can further be utilized to separate unwanted gases present in the air, for example carbon dioxide, methane gas etc. Methane gas as well as carbon dioxide are harmful gases present in the air surrounding us. To be able to collect for example methane or carbon dioxide from the atmosphere and to separate the harmful gases from the air would lead to a considerable decrease of harmful greenhouse gases.

Collected harmful gases can either be used to produce energy, such as natural gas or be permanently stored in geological formations. Although natural gas has a climate impact that is 34 times the climate impact of carbon dioxide, it has the advantage that it gives a clean combustion with low emissions of environmental and health harmful substances. Carbon dioxide in turn can for example be concentrated and pressurized after capture and transferred to water phase before transportation.

Combustion of fossil fuels further results in an elevated content of carbon dioxide in the atmosphere. Parallel to the extensive work with finding new energy sources there is also an enormous effort to try to elaborate new methods of decreasing the discharge of carbon dioxide to the atmosphere.

The system according to the invention can also be used to filter out carbon dioxide from the atmosphere. A gas collecting means is used together with a wind collector, in the same way as has been described above. The inlet is provided with a membrane or set of membranes 5 that lets carbon dioxide pass through the membrane. It is also possible necessary to combine the membrane 5 with other membranes to filter out smaller molecules that also passes through the first membrane. It might be possible to combine a separation of carbon dioxide from the atmosphere with the extraction of for example hydrogen, methane and helium as described above. The carbon dioxide will then be further concentrated and pressurized before it can be transferred to water phase and then transported off to appropriate storing or further treatment.

One preferred embodiment according to the present invention is a system for extracting gaseous molecules from the air, wherein the system comprises a gas tower 1, where the gas tower 1 is provided with an inlet 3; a membrane 5 having a pore size which only allows gaseous molecules having a size smaller than a pre-determined value to pass through the membrane; a collecting tank 4 for receiving the molecules that passes through the membrane 3; air exhauster to remove air from the tower during startup; and gas exhauster to utilize the filtered out gases. The gas tower 2 can further be provided with a wind collecting means 2 to help direct a flow of air towards the inlet of the tower, a storing tank 6 for storing the filtered out gases. An outer membrane to filter off solid particles, leaves and other solid parts present in the air can be used if needed.

One way of utilizing the energy in the gas is to burn it in a gas turbine connected to a generator to produce electricity. During the combustion, water vapour is formed and in some boilers it is possible to utilize the warm water vapour to produce more electricity and in addition also district heating.

The system according to the invention will also be provided with a control system.

One possible embodiment of the present invention is a system for extracting molecules, atoms and ions of one pre-determined size from the air, wherein the system comprises a gas tower 1, where the gas tower 1 is provided with a wind collecting means 2 to direct a flow of air towards the tower; an inlet 3 for the air; a first membrane 5' to filter out molecules of a particular predetermined size from the air coming in towards the tower; collecting tank for receiving the molecules, ions and atoms that passes through the membrane 5; air exhauster to remove air from the tower during startup; and gas exhauster to utilize the filtered out gases. The filtered gas can then be stored in storing tanks 6 or pumped off in a pipeline for use at a different location. An outer membrane to filter off solid particles, leaves and other solid parts present in the air can be added if needed. In this way it would be possible to filter out for example methane in one tower, hydrogen gas in one tower, carbon dioxide in another tower etc. Of course, there will also be even smaller molecules present. These can then be separated further in the tower or in the storing tanks.

Another possible embodiment of the present invention is a system for extracting more than one type of molecules, wherein the system comprises at least two gas towers 1, where each gas tower 1 is provided with; a first membrane 5' to filter out molecules having a size smaller than a first pre-determined value from the air coming in towards the tower; air exhauster to remove air from the tower during startup; and gas exhauster to utilize the filtered out gases. The first of the at least two towers is provided with a membrane 5' that lets molecules of a first pre-determined size to pass through the membrane and the second of the at least two towers is provided with a membrane 5" that lets molecules of second pre-determined size, wherein the second pre-determined size is smaller than the first pre-determined size, to pass through the membrane 5". For example, hydrogen gas can be filtered off into one gas tower and methane gas into another gas tower. The filtered gases can then be stored in collecting tanks 4 or pumped off in a pipeline for use at a different location. An outer membrane to filter off solid particles, leaves and other solid parts present in the air can be used if needed. The system can further be provided with at least one wind collecting means 2 to help direct a flow of air towards the tower.

Still another possible embodiment of the present invention is a system comprising a gas tower, where the gas tower 1 is provided with a first membrane 5' to filter out methane gas from the air coming in towards the tower and a collecting tank 4' for methane gas; a second membrane 5" to filter out hydrogen gas from the gas going through the first membrane 5' and a collecting tank 4" for hydrogen gas; and a third membrane 5'" to filter out helium gas going through both the first and the second membrane and a collecting tank 4'" for helium gas; air exhauster to remove air from the tower during startup; and gas exhauster to utilize the filtered out gases. The filtered gases can then be stored in storing tanks 6 or pumped off in a pipeline for use at a different location. An outer membrane to filter off solid particles, leaves and other solid parts present in the air can be used if needed. The system can further be provided with at least one wind collecting means 2 to help direct a flow of air towards the tower.

A further possible embodiment of the present invention is a system for extracting carbon dioxide from the air, wherein the system comprises a gas tower 1, where the gas tower 1 is provided with a membrane 5 to filter out carbon dioxide from the air coming in towards the tower; a collecting tank 4 configured to receive a flow of carbon dioxide separated from the air; air exhauster to remove air from the tower during startup; and gas exhauster to utilize the filtered out gases. The filtered gases can then be concentrated and pressurized and transferred to water phase before transportation to a different location. The system can further be provided with at least one wind collecting means 2 to help direct a flow of air towards the tower. An outer membrane to filter off solid particles, leaves and other solid parts present in the air can be used if needed.

The membrane(s) and storing tank(s) can either be placed vertically (as in FIG. 2) or horizontally (as in FIG. 4) inside the air collecting means.

The present disclosure has been particularly described with reference to preferred embodiments and different aspects of these, it will be appreciated by those skilled in the art that various changes and modifications may be made without departing from the scope of the claims and the spirit of the disclosure.

The invention claimed is:

1. A system for separating and storing molecules, atoms and/or ions from air, comprising:
   at least one air collecting means, comprising
      at least one collecting tank configured to receive molecules, atoms and/or ions separated from air through an inlet; and
      at least two membranes serially fit in the inlet of the collecting tank at an appropriate distance from each other and configured to let a specified pre-determined size of molecules, atoms and/or ions to pass through the at least two membranes;
   at least one storing tank for storing the separated molecules, atoms and/or ions, and
   at least one outlet,
      wherein a first of the at least two membranes filters out gaseous molecules that have a size smaller than a first pre-determined size and a second of the at least two membranes filters out gaseous molecules that have a second pre-determined size, wherein the second pre-determined size is smaller than the first pre-determined size.

2. The system according to claim 1, wherein the at least one air collecting means is a gas tower or a gas balloon.

3. The system according to claim 1, wherein at least one of the membranes is a multi-layer sheet membrane or an array of membranes.

4. The system according to claim 1, wherein at least one of the membranes is a nano membrane.

5. The system according to claim 1, wherein the at least two membranes are both graphene membranes or both borophene membranes, or one is a borophene membrane and the other is a graphene membrane.

6. The system according to claim 1, comprising at least two separated storage tanks for storing the collected gases.

7. The system according to claim 1, wherein the air collecting means consists of several cooperating air collecting means connected to each other.

8. The system according to claim 7, wherein the air collecting means is placed in a circular formation.

9. The system according to claim 1, wherein the at least two membranes cover at least half of the outer area of the at least one air collecting means.

10. The system according to claim 1, wherein several air collecting means are placed in close vicinity of each other.

11. The system according to claim 1, wherein the system also comprises at least one wind collecting means configured to direct a flow of air towards the inlet of the air collecting means.

12. The system according to claim 3, wherein the multi-layer sheet membrane or array of membranes comprises combinations of different nano membranes.

13. The system according to claim 1, wherein the molecules, atoms and/or ions are one or more of carbon dioxide, hydrogen, methane, helium and oxygen.

14. The system according to claim 4, wherein the nano membrane is a graphene membrane or a borophene membrane.

15. The system according to claim 1 wherein the at least one air collecting means is a wind-blown air collecting means.

* * * * *